US012366025B2

(12) United States Patent
Han et al.

(10) Patent No.: US 12,366,025 B2
(45) Date of Patent: Jul. 22, 2025

(54) LAUNDRY TREATING APPARATUS

(71) Applicant: LG ELECTRONICS INC., Seoul (KR)

(72) Inventors: Injae Han, Seoul (KR); Dongkil Choi, Seoul (KR); Sangwook Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 17/912,276

(22) PCT Filed: Mar. 16, 2021

(86) PCT No.: PCT/KR2021/003253
§ 371 (c)(1),
(2) Date: Sep. 16, 2022

(87) PCT Pub. No.: WO2021/187875
PCT Pub. Date: Sep. 23, 2021

(65) Prior Publication Data

US 2023/0167594 A1 Jun. 1, 2023

(30) Foreign Application Priority Data

Mar. 16, 2020 (KR) ........................ 10-2020-0032179
Mar. 16, 2021 (KR) ........................ 10-2021-0033989

(51) Int. Cl.
*D06F 33/52* (2020.01)
*D06F 33/44* (2020.01)
(Continued)

(52) U.S. Cl.
CPC .............. *D06F 33/52* (2020.02); *D06F 33/44* (2020.02); *D06F 34/06* (2020.02); *D06F 34/26* (2020.02);
(Continued)

(58) Field of Classification Search
CPC .......... D06F 34/26; D06F 58/40; D06F 34/06; D06F 33/52; D06F 58/26; D06F 33/44;
(Continued)

(56) References Cited

U.S. PATENT DOCUMENTS

2002/0184789 A1 12/2002 Gardner et al.
2013/0145642 A1 * 6/2013 Lee ......................... F26B 25/06 34/562
(Continued)

FOREIGN PATENT DOCUMENTS

CN 101082161 A 12/2007
CN 101680153 A 3/2010
(Continued)

*Primary Examiner* — Benjamin L Osterhout
(74) *Attorney, Agent, or Firm* — Birch, Stewart, Kolasch & Birch, LLP

(57) ABSTRACT

A laundry treating apparatus includes a drum for receiving laundry; a motor for driving the drum; a drying unit for drying the laundry by heating the drum; and a memory for storing a control temperature table in which a control temperature according to the lapse of drying time of the laundry is recorded, wherein the drying unit operates on the basis of a control temperature table obtained by shifting the stored control temperature table at least one time.

14 Claims, 12 Drawing Sheets

(51) Int. Cl.

| | |
|---|---|
| ***D06F 34/06*** | (2020.01) |
| ***D06F 34/26*** | (2020.01) |
| ***D06F 58/26*** | (2006.01) |
| ***D06F 58/40*** | (2020.01) |
| *D06F 34/28* | (2020.01) |
| *D06F 103/04* | (2020.01) |
| *D06F 103/32* | (2020.01) |
| *D06F 103/38* | (2020.01) |
| *D06F 105/12* | (2020.01) |
| *D06F 105/20* | (2020.01) |
| *D06F 105/56* | (2020.01) |
| *H05B 6/10* | (2006.01) |

(52) U.S. Cl.

CPC .............. *D06F 58/26* (2013.01); *D06F 58/40* (2020.02); *D06F 34/28* (2020.02); *D06F 2103/04* (2020.02); *D06F 2103/32* (2020.02); *D06F 2103/38* (2020.02); *D06F 2105/12* (2020.02); *D06F 2105/20* (2020.02); *D06F 2105/56* (2020.02); *H05B 6/10* (2013.01)

(58) Field of Classification Search

CPC .. D06F 2103/32; D06F 34/28; D06F 2105/12; D06F 2103/04; D06F 2103/38; D06F 2105/56; D06F 2105/20; H05B 6/10

See application file for complete search history.

(56) References Cited

U.S. PATENT DOCUMENTS

| | | | | |
|---|---|---|---|---|
| 2017/0211224 | A1 | 7/2017 | Rizzi et al. | |
| 2019/0048517 | A1* | 2/2019 | Park | D06F 58/26 |
| 2019/0062981 | A1* | 2/2019 | Kim | D06F 33/52 |
| 2019/0352838 | A1* | 11/2019 | Lim | D06F 58/26 |
| 2020/0040515 | A1 | 2/2020 | Bellm et al. | |

FOREIGN PATENT DOCUMENTS

| | | | |
|---|---|---|---|
| CN | 107780163 | A | 3/2018 |
| CN | 110438779 | A | 11/2019 |
| EP | 3 327 195 | B1 | 8/2019 |
| KR | 10-2004-0100555 | A | 12/2004 |
| KR | 10-2006-0004376 | A | 1/2006 |
| KR | 10-2006-0046994 | A | 5/2006 |
| KR | 10-2013-0064268 | A | 6/2013 |
| KR | 10-2013-0065207 | A | 6/2013 |
| KR | 10-2019-0022212 | A | 3/2019 |
| WO | WO 2009/077301 | A1 | 6/2009 |

* cited by examiner

LAUNDRY TREATING APPARATUS

CROSS REFERENCE TO RELATED APPLICATIONS

This application is the National Phase of PCT International Application No. PCT/KR2021/003253, filed on Mar. 16, 2021, which claims priority under 35 U.S.C. 119(a) to Patent Application No. 10-2020-0032179, filed in the Republic of Korea on Mar. 16, 2020 and Patent Application No. 10-2021-0033989 filed in the Republic of Korea on Mar. 16, 2021, all of which are hereby expressly incorporated by reference into the present application.

TECHNICAL FIELD

The disclosure relates to a laundry treating apparatus.

BACKGROUND ART

A laundry treating apparatus may include a washing machine for washing laundry, a dryer for drying laundry or wet clothing, an apparatus for refreshing clothing, etc. The washing machine may be a washer-dryer combo having a drying function.

For instance, the washing machine includes a tub (outer case) that stores washing water and a drum (inner case) that is rotatably provided in the tub. Laundry is put into the drum, and is washed by detergent and washing water as the drum rotates. The dryer dries the laundry by rotating the drum and applying heat the laundry in the drum.

Generally, drying may be performed by supplying high-temperature hot air into the drum to heat an object and thereby evaporate water. An exhaust-type dryer for discharging humid air to the outside of the washing machine and a circulation-type dryer for condensing water from humid air and supplying the water back to the drum may be provided.

Meanwhile, the laundry treating apparatus may be provided with a heater. The heater is commonly operated while being submerged in water in the tub to directly heat water. Since such a type of heater should be operated while being always submerged in water for safety reasons, it may be used to heat water in the tub, but it is not suitable for heating air in the drum in a state where there is no water in the tub, or for heating wet laundry before spin-drying. Recently, a laundry treating apparatus configured such that a drum is heated by an induction heating system is being used.

For the purpose of drying, a process of efficiently controlling the temperature of the drum is required. For many situations, a control temperature table may be generated and the generated control temperature table may be used to control temperature during a drying operation. That is, by controlling a drying unit (e.g. heater) according to the control temperature table to perform the drying operation, the temperature of the drum may be efficiently managed and the overheating thereof may be prevented.

Conventionally, the control temperature table was experimentally obtained and set for many situations. In particular, during development, it was necessary to experimentally obtain the control temperature table in response to all environments and situations.

Accordingly, a lot of experimentation may be required to control drying temperature. That is, a lot of experimentation may be required according to conditions such as a drying course (normal/low temperature), a load (small/medium/large), a drying situation (intermittent/continuous), outdoor temperature (low temperature/room temperature/high temperature), fabric (synthetic fiber/cotton, etc.), and a water content (low/middle/high).

That is, experiments with the small load, the medium load, and the large load should be carried out, and the control temperature table should be obtained through manual experiments according to each situation, such as a low-temperature drying course, continuous drying, a high-temperature condition, or a low water-content content.

In the case of drying in different courses and situations (low-temperature drying course, continuous drying situation, washing or drying related course, high-temperature outdoor-air condition, mixed-material clothing, low water-content load, etc.) using the control temperature table obtained through the above-described method, the output fluctuation of the drying unit becomes severe. Thereby, the fluctuation of the system temperature also becomes severe, thus affecting a detection method using temperature (dryness detection, abnormal-state detection, etc.) and thereby causing a false detection.

Further, even if the control temperature table is experimentally obtained and applied according to each situation, there is a high probability that a false detection occurs due to unexpected conditions, etc., and many control tables should be configured, which may impose a heavy burden on a system memory.

Therefore, a method of solving problems that may occur in the case of performing such a drying operation is needed.

SUMMARY

The present disclosure aims to solve the above problems and other problems.

An objective of the present disclosure is to provide a laundry treating apparatus, such as a dryer capable of efficiently managing a drum temperature in a drying operation, a washing machine, a washer-dryer combo, or a clothing refresh apparatus.

Further, an objective of the present disclosure is to provide a laundry treating apparatus capable of effectively preventing the overheating of clothing.

Further, an objective of the present disclosure is to provide a laundry treating apparatus capable of preventing malfunction by actively coping with a situation occurring during drying.

Further, an objective of the present disclosure is to provide a laundry treating apparatus capable of performing a drying operation by obtaining a minimum control temperature table and controlling the temperature of a drum.

Further, an objective of the present disclosure is to provide a laundry treating apparatus capable of performing a drying operation by obtaining a control temperature table through experiments for load (small, medium, and large) and controlling the temperature of a drum.

Further, an objective of the present disclosure is to provide a laundry treating apparatus capable of remarkably reducing experimentation for drying load under various conditions, by using an active variable control that may be applied in all situations using a single control temperature table.

Further, an objective of the present disclosure is to provide a laundry treating apparatus capable of reducing a burden on a memory.

In a laundry treating apparatus such as a washer-dryer combo or a dryer, when drying is performed, a drying unit such as a heater is operated and a drum temperature rises. In this case, the drum temperature may be controlled to be within a certain range so as to protect clothing.

A laundry treating apparatus according to an aspect of the present disclosure can efficiently manage a drum temperature in a drying operation, through active variable control according to drying conditions and situations.

A laundry treating apparatus according to an aspect of the present disclosure can prevent malfunction and efficiently manage a drum temperature, by shifting and using a control temperature table according to a drying condition.

A laundry treating apparatus according to an aspect of the present disclosure can reduce a memory burden and manufacturing cost, by using a control temperature table generated with minimal experiment.

A laundry treating apparatus according to an aspect of the present disclosure can manage temperature while actively coping with a situation that occurs, by shifting and using a control temperature table based on a change in drying course and drum temperature.

A laundry treating apparatus according to an aspect of the present disclosure may include a drum for receiving laundry; a motor for driving the drum; a drying unit for drying the laundry by heating the drum; and a memory for storing a control temperature table in which a control temperature according to the lapse of drying time of the laundry is recorded, and the drying unit may be operated on the basis of a control temperature table obtained by shifting the stored control temperature table at least one time.

The shift of the control temperature table may collectively change control temperature data corresponding to each time by a temperature that is set for each drying course.

The control temperature table may be shifted on the basis of the set drying course, as the laundry starts drying.

The shift of the control temperature table may include collectively changing time data corresponding to each control temperature.

The laundry treating apparatus may further include a drying temperature sensor disposed to be spaced apart from the drum. The control temperature table may be shifted by a difference between time when a temperature detected by the drying temperature sensor reaches a reference temperature and time when the control temperature table reaches the reference temperature.

Further, the control temperature table control temperature table may include an upper limit value and a lower limit value of the control temperature, increase an output of the drying unit if the temperature detected by the drying temperature sensor is smaller than the lower limit value, and reduce the output of the drying unit if the temperature detected by the drying temperature sensor is larger than the upper limit value.

Further, the output of the drying unit may be increased if the time when the temperature detected by the drying temperature sensor reaches the reference temperature is slower than the time when the control temperature table reaches the reference temperature, and the output of the drying unit may be reduced if the time when the temperature detected by the drying temperature sensor reaches the reference temperature is faster than the time when the control temperature table reaches the reference temperature.

The induction heater may be spaced apart from the drum. The induction heater may be installed in the tub. The induction heater may be secured to the tub. In the laundry treating apparatus such as a dryer having no tub, the induction heater may be disposed in or on an inner wall of a case.

In the laundry treating apparatus having no tub such as the dryer, the induction heater may be disposed on the upper side, lower side, left side or right side of the drum in a case to be spaced apart from the drum.

The induction heater may be located on an upper portion of the outside of the drum.

The induction heater may generate a magnetic field. The induction heater heats the drum using a magnetic field.

The drum may include a cylindrical body and a hole formed in the body.

The laundry treating apparatus may further include a control unit that shifts the control temperature table and controls the driving of the motor and the drying unit on the basis of the shifted control temperature table.

Further, the control unit may fix the control temperature table for time and shift it in a temperature direction, on the basis of a corresponding drying course.

Further, the control unit may fix the control temperature table for temperature and shift it in a time direction, on the basis of a change in the temperature of the drum.

According to an aspect of the present disclosure, while a control temperature table (or control profile according to temperature) for controlling a drum including a load under a certain condition using a drying unit in a certain temperature range is experimentally created and this control temperature table is shifted according to various situations, drying may be performed.

That is, while a control temperature table according to time is obtained only in the experiment for some load (e.g. small, medium, and large) and the control temperature table is shifted according to various situations, drying may be performed.

For instance, the present disclosure may include a step of loading a control temperature table for controlling a drum including a load under a certain condition in a certain temperature range using a drying unit such as a heater; a first shift step of shifting the control temperature table according to a corresponding drying course; and a second shift step of shifting the control temperature table to a current time when it is determined whether a current temperature of the drum reaches a control start temperature of the corresponding drying course, so the current temperature of the drum reaches the control start temperature of the corresponding drying course.

As a specific example, the present disclosure may include a method of controlling a laundry treating apparatus including a tub, a drum rotatably provided in the tub to receive laundry, and a drying unit for drying the laundry, the method including a step of starting a drying operation of drying a load of a first condition in the drum using the drying unit; a step of loading a control temperature table for controlling a drum including a load under a second condition in a certain temperature range using the drying unit; a first shift step of shifting the control temperature table according to a corresponding drying course; a step of determining whether a current temperature of the drum reaches a control start temperature of the corresponding drying course; and a second shift step of shifting the control temperature table to a current time when the current temperature of the drum reaches the control start temperature of the corresponding drying course.

Further, the control temperature table may record the control temperature for drying the load of the second condition.

Further, the drying unit may include an induction heater.

Further, the control temperature table may be recorded according to temperature and time for controlling the drum including the load of the second condition in a certain temperature range.

Further, the first shift step may fix the control temperature table for the time and shift it in the temperature direction.

Further, the second shift step may fix the control temperature table for the temperature and shift it in the temperature direction.

Further, the control temperature table may include an upper limit value and a lower limit value for controlling the drum including the load of the second condition in a certain temperature range.

Further, the method may further include a step of determining whether the drying operation satisfies a drying end condition.

Further, the method may further include a step of terminating the drying operation when the drying operation satisfies the drying end condition; and a step of regulating the output of the drying unit when the drying operation does not satisfy the drying end condition.

Further, the step of regulating the output of the drying unit may increase or reduce the output of the drying unit by determining the temperature of the drum.

Further, the step of regulating the output of the drying unit may include a step of increasing the output of the drying unit when the temperature of the drum is smaller than the lower limit value; and a step of reducing the output of the drying unit when the temperature of the drum is larger than the upper limit value.

As another specific example, the present invention includes a tub; a drum rotatably provided in the tub to receive laundry; a motor for driving the drum; a drying unit for drying the laundry; and a control unit for controlling the driving of at least one of the drum, the motor, and the drying unit, the control unit starts a drying operation of drying a load of a first condition in the drum using the drying unit, loads a control temperature table for controlling a drum including a load of a second condition in a certain temperature range using the drying unit, shifts the control temperature table according to a corresponding drying course, determines whether a current temperature of the drum reaches a control start temperature of the corresponding drying course, and controls to shift the control temperature table to a current time when the current temperature of the drum reaches the control start temperature of the corresponding drying course.

Further, the control unit may fix the control temperature table for time and shift it in a temperature direction, when the control temperature table is shifted according to a corresponding drying course.

Further, the control unit may fix the control temperature table for temperature and shift it in a time direction, when the control temperature table is shifted to a current time.

Further, the control temperature table may include an upper limit value and a lower limit value for controlling the drum including the load of the second condition in a certain temperature range.

Further, the control unit may terminate the drying operation when the drying operation satisfies the drying end condition, and may regulate the output of the drying unit when the drying operation does not satisfy the drying end condition.

Further, the control unit may increase the output of the drying unit when the temperature of the drum is smaller than the lower limit value, and may reduce the output of the drying unit when the temperature of the drum is larger than the upper limit value.

Advantageous Effects

An embodiment of the present disclosure has the following effects.

First, a control temperature table can be obtained through experiments for load (small, medium, and large), and the control temperature table obtained in this way can be shifted and applied according to various situations.

That is, by using an active variable control applied in all situations using one control temperature table, experimentation required for drying load under various conditions can be remarkably reduced.

For this reason, it is possible to stably control an induction heater even in an unexpected situation and to improve system control stability. That is, it is possible to reduce the probability of false detection of an algorithm based on temperature and induction heater output.

Moreover, since only one control temperature table may be used, a control unit (Micom) memory can be efficiently used.

DESCRIPTION OF EXEMPLARY EMBODIMENTS

Figure 1:
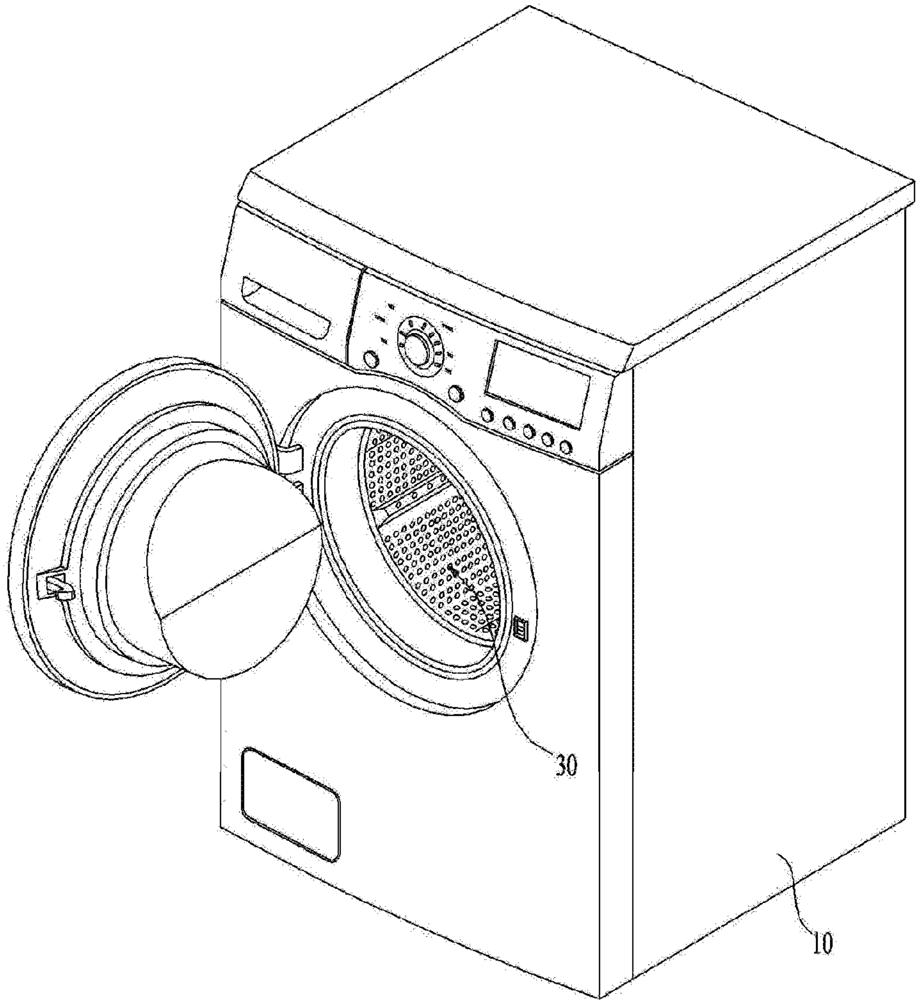
FIG. 1 is a perspective view showing the outside of a laundry treating apparatus according to an embodiment of the present disclosure.

Hereinafter, embodiments of the present disclosure will be described in detail with reference to the accompanying drawings. The same reference numerals are used throughout the drawings to designate the same or similar components, and a duplicated description thereof will be omitted.

The suffixes "module" and "unit" for components used in the following description are given or used in consideration of only the ease of describing the specification, and do not have distinct meanings or roles. When it is determined that the detailed description of the known art related to an embodiment disclosed in the specification may be obscure the gist of the embodiment, the detailed description thereof will be omitted.

Further, it is to be understood that the accompanying drawings are merely for making those skilled in the art easily understand the embodiment disclosed herein, the technical spirit of the present disclosure is not limited to the accompanying drawings, and the present disclosure covers all alternatives, modifications, and equivalents that fall within the spirit and scope of the present disclosure.

Herein, the singular forms are intended to include the plural forms as well, unless the context clearly indicates otherwise.

Furthermore, although each drawing is described for the convenience of description, it is apparent to those skilled in the art that other embodiments may be implemented by combining at least two or more drawings without departing from the scope of the present invention.

Although the terms "first", "second", etc. may be used herein to describe various components, these components should not be limited by these terms. These terms are only used to distinguish one component from another component.

It should be understood that when a component is referred to as being "coupled" or "connected" to another component, it can be directly coupled or connected to the other component or intervening components may be present therebetween. In contrast, it should be understood that when a component is referred to as being "directly coupled" or "directly connected" to another component, there are no intervening components present.

Further, it should be understood that, when a first component such as a layer, a region or a module is referred to as being "on" a second component, the first component may be not only directly on the second component but a third component may be interposed between them.

Hereinafter, a laundry treating apparatus and a control method thereof according to an embodiment of the present disclosure will be described in detail with reference to the accompanying drawings. Hereinafter, a washing machine will be described as a representative example of the laundry treating apparatus according to the present disclosure. However, the laundry treating apparatus of the present disclosure is not limited thereto.

Hereinafter, the laundry treating apparatus according to an embodiment of the present disclosure will be described with reference to FIGS. 1 and 2.

FIG. 1 is a perspective view showing the outside of a laundry treating apparatus according to an embodiment of the present disclosure. Further, FIG. 2 is a sectional view showing the inside of the laundry treating apparatus according to an embodiment of the present disclosure.

The washing machine according to an embodiment of the present disclosure may include a drum 30, and a drying unit that heats the drum 30. Such a drying unit may include at least one heater 70. More preferably, the drying unit may include an induction heater 70. The washing machine may further include a cabinet 10 that defines an appearance.

The washing machine may further include a tub 20 that receives the drum 30.

The tub 20 may be provided inside the cabinet 10. The tub 20 may provide a receiving space. The tub 20 may have on a front thereof an opening. The tub 20 may receive washing water. The tub 20 may be provided to receive the drum 30.

The drum 30 may be rotatably provided inside the tub 20. The drum 30 may be provided in the receiving space of the tub 20. The drum 30 may receive laundry. An opening may be provided in the front of the drum 30. The laundry may be put into the drum 30 through the opening.

A hole 30*h* may be formed in the circumferential surface of the drum 30 such that air and washing water communicate between the tub 20 and the drum 30. Hereinafter, the circumferential surface of the drum 30 may also be referred to as the body of the drum 30. The body of the drum 30 may extend in the shape of a cylinder.

The drum 30 may be formed of a conductor. The body of the drum 30 may be formed of a conductor. The body of the drum 30 may be formed of metal.

An induction heater or an IH module 70 may heat the drum 30. The induction heater 70 may generate a magnetic field. The induction heater 70 may be provided to heat the drum 30 using the magnetic field.

The induction heater 70 may be provided on the outer circumference of the tub 20. The induction heater 70 may be provided on the upper portion of the tub 20. The induction heater 70 may be secured to the tub 20. The induction heater 70 may be spaced apart from the drum 30. Here, the induction heater 70 may perform a laundry drying function by heating the drum 30. However, a general heater as well as the induction heater 70 may be provided. That is, various heaters such as a sheath heater or a heater using a heat pump may be provided.

Each of the tub 20 and the drum 30 may be formed in a cylindrical shape. Thus, the inner circumference and the outer circumference of each of the tub 20 and the drum 30 may be substantially formed in a cylindrical shape. A rotating shaft of the drum 30 may pass through the rear surface of the washing machine. That is, a straight line extending along the rotating shaft 42 of the driving unit 40 may pass through the rear surface of the washing machine.

Figure 2:
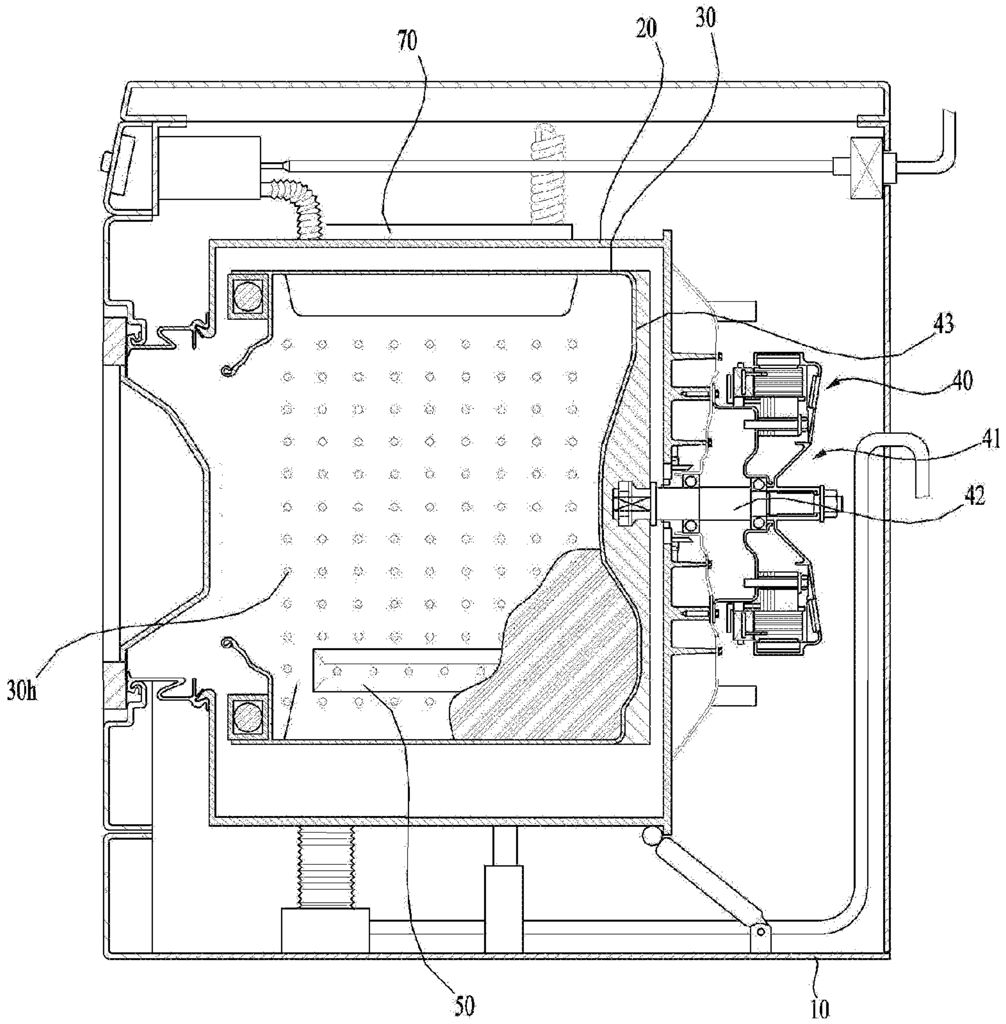
FIG. 2 is a sectional view showing the inside of the laundry treating apparatus according to an embodiment of the present disclosure.

FIG. 2 illustrates the washing machine configured such that the drum 30 is rotated about a rotating shaft parallel to the ground. Unlike shown in the drawing, the drum 30 and the tub 20 may tilted rearward. The rotating shaft of the drum 30 may pass through the rear surface of the washing machine. That is, a straight line extending along the rotating shaft 42 of the driving unit 40 may pass through the rear surface of the washing machine.

The laundry treating apparatus may further include a driving unit 40 that is provided to rotate the drum 30 inside the tub 20. The driving unit 40 may include a motor 41. The motor 41 may include the rotating shaft 42. The rotating shaft 42 may be connected to the drum 30 to rotate the drum 30 inside the tub 20.

The motor 41 may include a stator and a rotor. The rotor may be connected to the rotating shaft 42.

The driving unit 40 may include a spider 43. The spider 43 may be configured to connect the drum 30 and the rotating shaft 42 and to uniformly and stably transfer the rotating force of the rotating shaft 42 to the drum 30.

The spider 43 may be coupled to the drum 30 such that at least a portion thereof is inserted into the rear wall of the drum 30. To this end, the rear wall of the drum 30 may be formed to be recessed into the drum 30. Further, the spider 43 may be coupled to the drum in the form of being further inserted into the drum 30 at the rotation center of the drum 30.

A lifter 50 may be provided in the drum 30. A plurality of lifters 50 may be provided in the circumferential direction of the drum 30. The lifter 50 may perform the function of stirring laundry. For instance, as the drum 30 rotates, the lifter 50 may lift the laundry upward.

The laundry moved upward is separated from the lifter 50 by gravity to fall downward. The laundry may be performed by impact force caused by falling. Of course, the stirring of the laundry may enhance drying efficiency. The lifter 50 may be formed to extend from the rear end of the drum 30 to the front end thereof. The laundry may be evenly distributed from front to rear in the drum 30.

Figure 3:
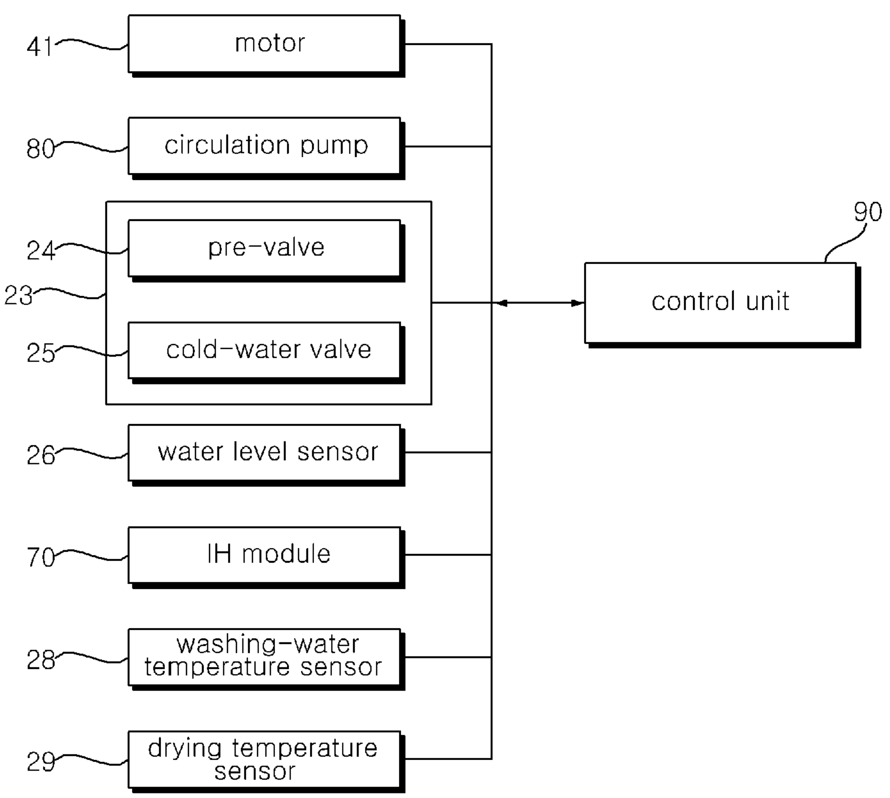
FIG. 3 is a block diagram showing the control configuration of the laundry treating apparatus according to an embodiment of the present disclosure.

FIG. 3 is a block diagram showing the control configuration of the laundry treating apparatus according to an embodiment of the present disclosure.

Hereinafter, the control configuration of the laundry treating apparatus according to an embodiment of the present disclosure will be described with reference to FIG. 3.

The control unit 90 serving as a main processor may be provided to control the operation of the laundry treating apparatus. The operation of various control configurations that will be described later may be controlled through the control unit 90.

The motor 41 may drive the drum. That is, the motor 41 may be provided to rotate the drum. The rotating force of the motor 41 may be directly or indirectly transmitted to the drum. For instance, a direct-coupled motor in which the rotating force of the motor 41 is directly transmitted to the drum may be used.

The driving pattern of the drum may vary depending on the driving pattern of the motor 41. Thus, the control unit 90 may control the driving of the motor 41 to generate various driving operations, such as the tumbling driving, filtration driving, and spin driving of the drum. The driving state of the drum may be referred to as the operation of the drum.

The tumbling driving (see FIG. 5) of the drum may be driving in which laundry in the drum is lifted and then dropped as the drum rotates at about 40 to 46 RPM. That is, the tumbling driving may be referred to as driving in which washing or laundry wetting is performed by mechanical force through the fall of laundry and the friction with the drum. Since this is driving in which laundry is stirred in the drum, this is commonly used.

The filtration driving (see FIG. 6) of the drum may be driving in which laundry is in close contact with the inner circumference of the drum inside the drum so that the drum and the laundry are integrally rotated, as the drum rotates at about 100 RPM. Here, the laundry is spread on the inner circumference of the drum and washing water is removed from the laundry.

The spin driving of the drum may be driving in which washing water is centrifugally dehydrated from laundry as the drum rotates about 800 RPM or more. The spin driving may be performed in a final washing process by a very large centrifugal force, so that all washing processes may be completed.

Thus, the RPM of the drum is increased in the order of the tumbling driving, the filtration driving, and the spin driving. The spin driving may be referred to as driving of continuously rotating the drum in one direction, and the tumbling driving and the spin driving may be referred to as driving of repeating forward and reverse rotation and stop.

For washing, the washing water should be supplied from the outside of the laundry treating apparatus to the inside of the tub. To this end, the laundry treating apparatus may be provided with a water supply valve 23. The water supply valve may be connected to an external water supply source. When the water supply valve is operated, the washing water may be supplied to the inside of the laundry treating apparatus.

If necessary, a plurality of water supply valves 23 may be provided. A cold-water valve 25 for supplying cold water from an external water supply source and a pre-valve 24 connected to a boiler or the like to supply water other than cold water, e.g. hot water may be provided.

When the temperature of the washing water is set to room temperature (cold water) during washing, the heating of the washing water may not be required. Thus, in this case, water supply may be performed only by the cold-water valve 25. However, when the temperature of the washing water is set to fixed temperature (25° C., 40° C., etc.) rather than room temperature during washing, washing water may be supplied through the pre-valve 24 and the cold-water valve 25. Of course, in the latter case, washing water may be supplied only through the cold-water valve 25.

Meanwhile, the pre-valve 24 and the cold-water valve 25 may be valves for supplying the same cold water. The watery supply through the pre-valve 24 may be the case of supplying water through the inside of the drum to the tub, and the water supply through the cold-water valve 25 may be the case of supplying water to the tub without passing through the inside of the drum. Of course, this may be performed in reverse.

Further, the pre-valve 24 may be a water supply valve for supplying washing water through a detergent box to the tub, and the cold-water valve 25 may be a water supply valve for directly supplying washing water to the inside of the tub without passing through the detergent box. Of course, this may be performed in reverse.

Thus, a plurality of water supply valves may be provided according to the temperature of washing water and the water supply course of washing water.

A water level sensor 26 may be provided to sense the water level of washing water supplied to the inside of the tub. That is, this may be referred to as a sensor for controlling a proper amount of washing water.

Generally, the water level sensor 26 may often use a frequency sensor that senses a water level through a frequency. This sensor senses the water level using a principle in which the sensed frequency varies depending on the water level. During washing, the water level sensor 26 senses the water level so that water is supplied between an empty water level and a maximum water level. The maximum water level is a heater protection water level as described above, and may be referred to as a water level at which a lower portion of the drum is submerged in the washing water. Generally, water is supplied until the level of the washing water becomes the heater protection water level after laundry fully absorbs the washing water.

The empty water level in the frequency sensor may be about 25.5 Khz, and the heater protection water level may be about 24.7 Khz. Of course, a specific frequency value may vary depending on the size of a washing machine, the model of the frequency sensor, and external environment. However, the higher the frequency in the frequency sensor, the lower the water level.

The control unit 90 controls the operation of the water supply valve 23 based on a water level value sensed by the water level sensor 26.

As an example of the heater, the induction heater (IH) 70 may be a heater that heats the drum 30 by induction. As described above, heaters other than the induction heater may be installed. Hereinafter, the induction heater 70 is described as an example of the heater, but the present invention is not limited thereto.

If the drum 30 is heated by the induction heater 70, the washing water may be heated. Of course, the washing water as well as the laundry contacting the drum 30 may be directly heated. The laundry absorbing the washing water may be directly heated by the heating method, thus making it possible to increase heating effect. Further, since the diffusion of heat to the surroundings is reduced, heating efficiency is further enhanced.

When washing, heating through the induction heater 70 may be performed based on temperature data sensed by a washing-water temperature sensor 28. That is, if the temperature of washing water reaches a preset temperature, heating may be completed.

By the induction heater 70, the drum 30 may be heated to about 160° C. in a short time. For instance, the outer-circumference temperature of the drum 30 may rise to 160° C. in about 3 seconds. Thus, since heat from the drum 30 is transmitted to the washing water and laundry, it may be necessary to prevent the overheating of the drum 30 or the overheating of the induction heater 70.

In order to prevent the overheating of the drum 30, a drying temperature sensor 29 may be provided. The drying temperature sensor 29 may be provided to directly or indirectly sense the outer-circumference temperature of the drum 30. When it is determined through the drying temperature sensor 29 that the drum 30 is overheated, the control unit 90 stops operating the induction heater.

The washing-water temperature sensor 28 may be mounted on the lower portion of the tub 20 to sense the temperature of the washing water. The drying temperature sensor 29 may be mounted on the upper portion of the tub 20 to sense the outer-circumference temperature of the drum 30. Thus, it is advantageous that both installation positions and sensing targets are different.

The washing-water temperature sensor 28 may directly sense the temperature of the washing water. The drying temperature sensor 29 may not be in contact with the rotating drum 30 to indirectly sense the temperature of the drum 30. Thus, it is advantageous that the sensing mechanisms or methods thereof are different from each other.

The washing-water temperature sensor 28 may be provided to sense the temperature of washing water when the drum 30 is stopped. This sensor may control so that the induction heater 70 is not operated when the washing-water temperature reaches a target temperature. The drying temperature sensor 29 may be provided to sense the temperature of the drum 30 when the drum 30 rotates. In particular, this sensor may be provided to sense the temperature when the drum 30 rotates and when the induction heater 70 rotates. Thus, it is advantageous that sensing times thereof are different from each other.

Such a dual sensor configuration may provide a safe laundry treating apparatus and a method of controlling the apparatus.

As the drum 30 is driven, detergent water absorbed by laundry may be gradually discharged to the tub 20, thereby deteriorating washing effect. Thus, a circulation pump 80 for supplying or re-supplying the detergent water to the laundry may be provided.

The circulation pump 80 may be configured such that a portion of the washing water is pumped out from the bottom of the tub 20, and the washing water is sprayed from the top of the drum 30 to the laundry. The washing effect can be improved by the injection pressure of the washing water, and the washing water (detergent water) may be re-supplied to the laundry so that the laundry always maintains a sufficiently wet state. Therefore, even if the laundry is not immersed in the washing water, effective washing can be performed.

Washing through the laundry treating apparatus may be performed through initial water supply, laundry wetting, heating, and a main washing step or section. After the main washing, rinsing and spin-drying may be performed to complete washing. The entire washing process or washing course is automatically performed in the order of a washing operation, a rinsing operation, and a spin-drying operation and then is completed.

The washing machine according to an embodiment of the present invention may further include a memory (not shown) in which various pieces of data are stored. The memory may store control data for controlling the operation of the washing machine, inputted operation setting data, data on an operation mode, reference data for determining an error, etc.

Further, data that is calculated, detected or measured during the operation of the washing machine may be stored in the memory.

Further, the control temperature table in which the control temperature is recorded according to the lapse of drying time may be stored in the memory.

The control unit 90 may be used by loading the control temperature table stored in the memory. Further, the control unit 90 may shift the control temperature table. If necessary, the control unit 90 may control to store the shifted control temperature table.

According to an embodiment, the control unit 90 may include a memory that stores the control temperature table. The control unit 90 may shift the control temperature table, and control the driving of the motor 41 and the drying unit based on the shifted control temperature table. The control unit 90 may shift the control temperature table one or more times according to the drying condition and situation, and control the drying operation on the basis of the shifted control temperature table.

The shift of the control temperature table may be performed by fixing data of any one item and collectively changing the remaining data by the same numerical value. For example, the control unit 90 may fix time data, and may collectively increase or reduce control temperature data corresponding to each time data, thus shifting the control temperature table. Further, the control unit 90 may fix control temperature data, and may collectively increase or reduce time data corresponding to each control temperature data, thus shifting the control temperature table.

Meanwhile, the control temperature table may be expressed in the form of a graph having time and temperature axes. In this case, the control temperature table may be fixed in any one axial direction, and may be shifted in the other axial direction. For example, the control unit 90 may fix the control temperature table for a time axis and shift it in a temperature-axis direction. Further, the control unit 90 may fix the control temperature table for the temperature axis and shift it in the time-axis direction.

Figure 4:
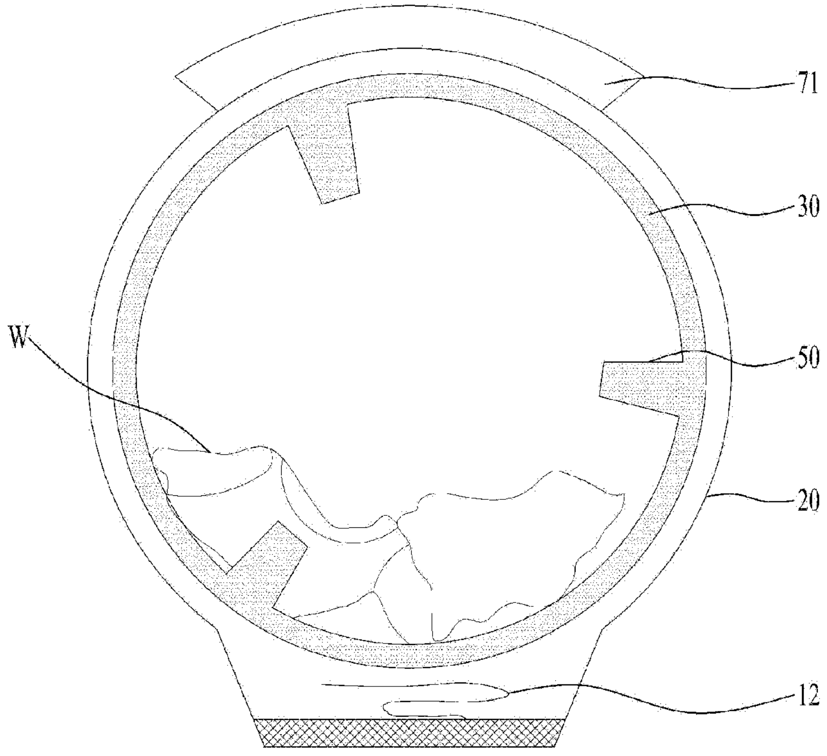
FIGS. 4 to 6 are diagrams showing the operation state during drum stop, tumbling driving, and filtration driving, respectively.
Figure 5:
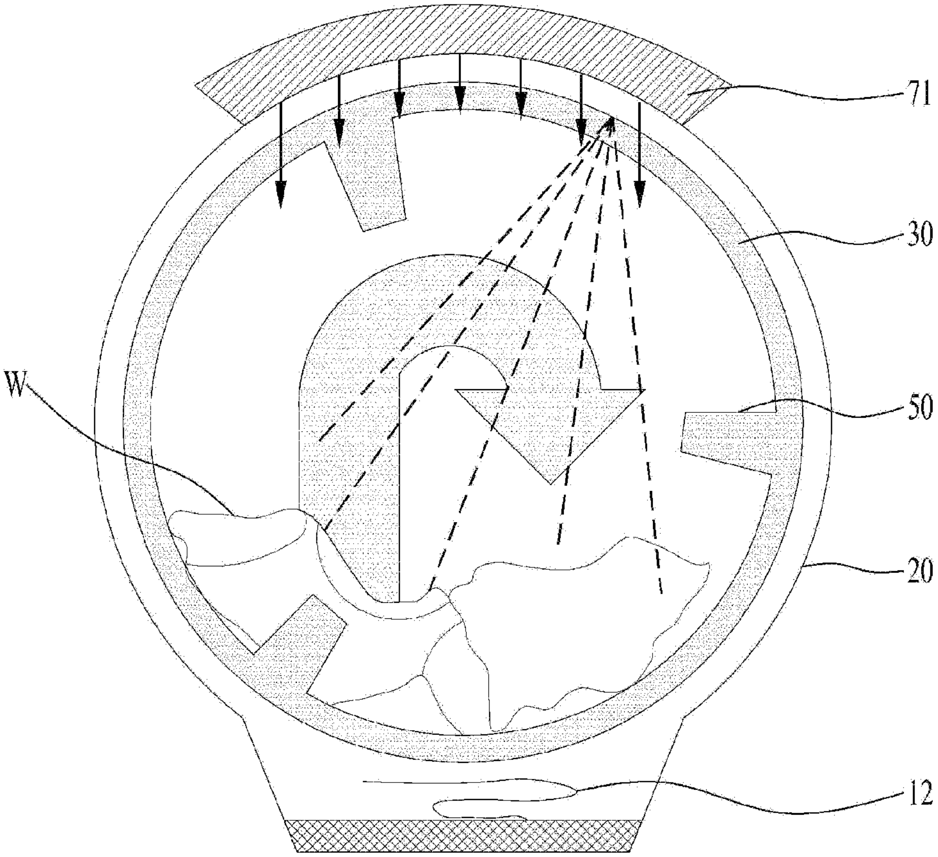
Figure 6:
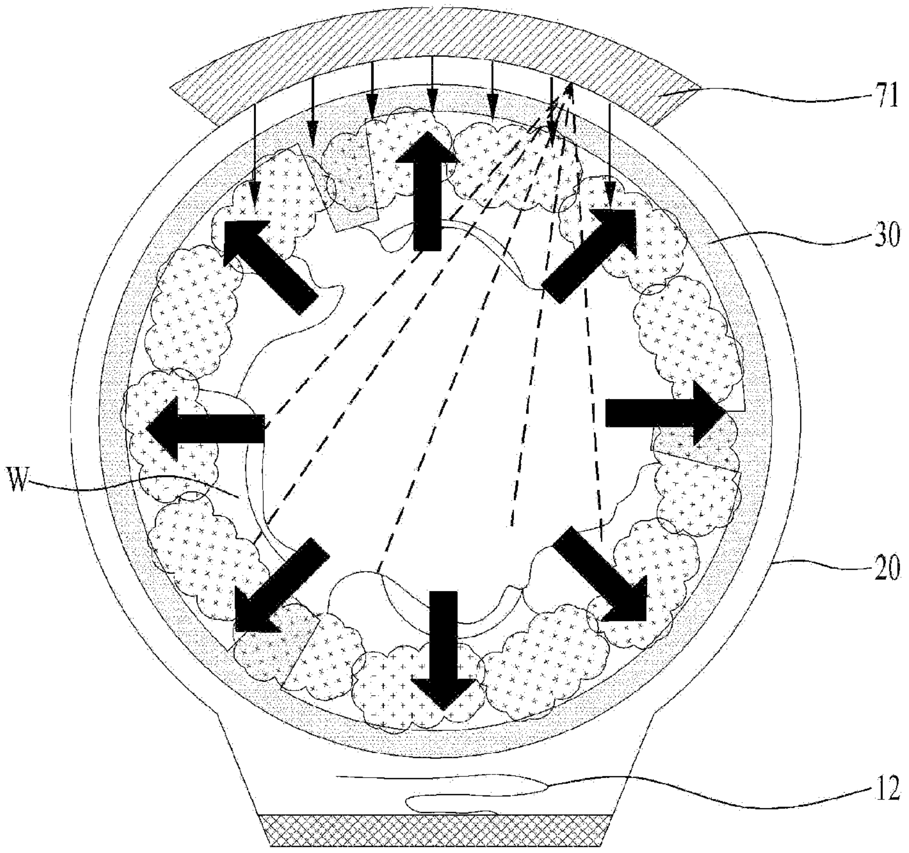

FIGS. 4 to 6 are diagrams showing a state during drum stop, tumbling driving, and filtration driving, respectively, in a method of controlling a laundry treating apparatus according to an embodiment of the present disclosure.

In this embodiment, as shown in FIGS. 4 to 6, the washing water may be heated using a coil 71 of the induction heater 70. Unless contradicting this, the sheath heater 12 may be provided on the lower portion of the tub. That is, the laundry treating apparatus according to this embodiment may include both the induction heater 70 and the sheath heater 12, and may include only the induction heater 70.

Thus, a mode in which washing water is heated using the sheath heater 12 as in the prior art may be used. On the other hand, a mode in which the washing water is heated using the induction heater 70 without operating the sheath heater 12 may be used.

As shown in FIG. 5, as the drum 30 rotates during tumbling driving, laundry may be moved up by the lifter 50 and then be fallen by gravity, and circulating water may be sprayed into the drum 30. Further, the induction module may be driven, so that the drum 30 may be heated.

As shown in FIG. 6, during filtration driving or filtration driving in circulation driving, as the drum rotates, laundry W may come into close contact with the inner circumference of the drum 30 to rotate integrally with the drum 30. This is because the centrifugal force generated by the rotation of the drum 30 is larger than gravity. At this time, the circulating water 30 may be sprayed into the drum, and the induction heater 70 may be driven to heat the drum 30.

FIGS. 5 and 6 show a state where washing water is circulated to be sprayed from the top of the drum 30 to the inside of the drum 30, and a state where the induction heater 70 (coil 71) is driven to provide a varying magnetic field to the drum 30. An eddy current is generated in the drum by a change in magnetic field, and heat is generated by the eddy current.

Thus, as shown in FIGS. 4 to 6, a heater protection water level is destroyed in the entire heating section, so that the water level will be always lower than the lowermost end of the drum, i.e., will be equal to or less than a circulation water level.

As described above, the tumbling driving of the drum may be referred to as driving in which laundry in the drum is lifted and dropped as the drum rotates at about 40 to 46 RPM. The tumbling driving may be referred to as driving in which washing or laundry wetting is performed by mechanical force through the fall of laundry and the friction with the drum. Since this is driving in which laundry is stirred in the drum, this is commonly used.

That is, the revolution number of about 40 to 46 RPM may correspond to a revolution number range in which laundry is bent and dropped in the drum 30. A motion in which the laundry is bent and dropped in the drum 30 may be referred to as a tumble or tumbling process.

Meanwhile, the laundry treating apparatus according to an embodiment of the present disclosure may perform a drying function. In this case, the laundry treating apparatus according to an embodiment of the present disclosure may be a washer-dryer combo. On the other hand, the laundry treating apparatus according to an embodiment of the present disclosure may be a dryer for drying laundry or wet clothing.

Air may be cooled and water may be condensed and discharged on the inner circumference of the tub 20. In other words, even if there is no air circulation in the tub 20, the drying may be performed by condensing water.

Cooling water may be supplied into the tub 20 to improve drying efficiency by more effectively condensing water. As a surface area where the cooling water meets the tub 20, that is, a surface area where the cooling water contacts air increases, it is more advantageous. To this end, the cooling water may be supplied while being widely spread from a rear surface, one side or both sides of the tub 20. Through the supply of the cooling water, the cooling water may flow along the inner surface of the tub 20 to prevent it from being introduced into the drum.

In order to perform the drying function, in some cases, a fan (not shown) for blowing air into the tub 20 and a duct (not shown) equipped with the fan may be further provided. The blowing fan may control the flow or air in the laundry treating apparatus during the drying process.

The laundry treating apparatus such as the dryer may not provided with the tub 20. The blowing fan may circulate the air of the drum 30.

Meanwhile, a separate heater may not be provided for drying laundry. That is, the laundry may be dried using the above-described heater, e.g., the induction heater 70. That is, washing-water heating during washing, object heating during spin-drying, and object heating during drying may be performed through one induction heater 70.

When the drum 30 is driven and the induction heater 70 is driven, the entire outer circumference of the drum 30 may be substantially heated. While the heated drum 30 exchanges heat with wet laundry, the laundry may be heated.

In this process, the air inside the drum 30 may also be heated. Thus, when the air is supplied into the drum 30, air from which water is evaporated through heat exchange may be discharged to the outside of the drum 30.

The air supply position and the air discharge position may be determined so that heated air is evenly supplied to the drying object and humid air is smoothly discharged. To this end, air may be supplied from the upper portion of the front of the drum 30, and the air may be discharged through the rear of the drum 30.

As described above, the induction heater 70 may be driven as the drum 30 is driven. At this time, the laundry may repeatedly rise and fall as the drum 30 is driven. That is, drying may be performed by the above-described tumbling driving. At this time, since the heating position of the drum 30 is not the lower portion of the drum 30 but is the upper portion thereof, the overheating of the clothing can be effectively prevented.

Figure 7:
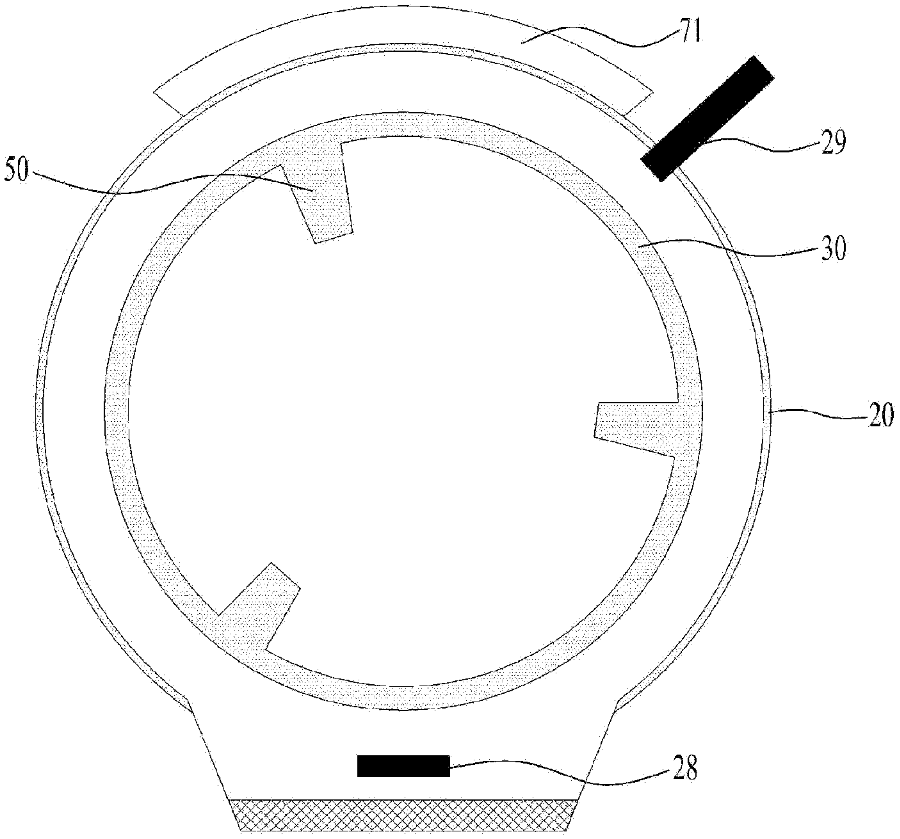
FIG. 7 is a schematic view of the laundry treating apparatus according to an embodiment of the present disclosure.

FIG. 7 is a schematic view of the laundry treating apparatus according to an embodiment of the present disclosure.

As described above, the laundry treating apparatus according to this embodiment may include two temperature sensors 28 and 29.

The washing-water temperature sensor 28 may be mounted on the lower portion of the tub 20 to sense the temperature of washing water. The drying temperature sensor 29 may be mounted on the upper portion of the tub 20 to sense the temperature of the outer circumference of the drum 30.

The control unit 90 controls the heating of washing water and the driving of the induction heater 70 (or the coil 71 of the induction heater 70, which will be commonly referred to as the induction heater 70) based on the temperature detected by the drying temperature sensor 29 when washing is performed.

As shown in FIG. 7, the coil 71 of the induction heater 70 may be mounted on the upper portion of the tub 20. That is, the induction heater 70 may be mounted on the outer circumference of the upper portion of the tub 20. In the laundry treating apparatus such as the dryer having no tub 20, the induction heater may be disposed on the inside or inner wall of a case. Even in this case, the induction heater 70 may be disposed on the upper portion of the drum 30. Due to the mounting position of the induction heater 70, the outer circumference of the upper portion of the drum may be heated by the induction heater 70.

Meanwhile, the induction heater 70 may be disposed on the upper side, lower side, left side or right side of the drum in the case to be spaced apart from the drum, in the laundry treating apparatus having no tub, such as the dryer.

Such a position of the induction heater 70 may be determined to effectively prevent the overheating of an object, because the object in the drum 30 does not contact the upper portion of the drum in a state where the drum 30 is stopped. Thus, as the drum 30 rotates, the induction heater 70 may be controlled to be driven. This means that the object may be evenly heated.

Here, the mounting position of the drying temperature sensor 29 may be important. This is because the temperature of the drum 30 by heating should be optimally measured and simultaneously the temperature of air in the tub 20 should be optimally measured.

The mounting position of the drying temperature sensor 29 may be one side of the induction heater 70, and it is advantageous that the mounting position is a position outside a projection plane to the lower side of the induction heater 70. To be more specific, the drying temperature sensor 29 may be mounted on the right side of the tub 20 at an approximately 2 o'clock position.

The drying temperature sensor 29 may be mounted to pass from the outside to the inside of the tub 20. Thus, a signal line or wire of the drying temperature sensor 29 may be provided outside the tub 20, and a sensing portion for sensing may be mounted to partially protrude from the inner circumference of the tub 20 inward in a radial direction.

Thus, the drying temperature sensor 29 may directly sense the temperature of air in space between the outer circumference of the drum 30 and the inner circumference of the tub. Through the sensing temperature, the temperature of the outer circumference of the drum 30 may be indirectly and experimentally sensed or estimated.

Meanwhile, the drying temperature sensor 29 may be disposed on the upper side, lower side, left side or right side of the drum in the case to be spaced apart from the drum, in the laundry treating apparatus having no tub, such as the dryer.

The control unit 90 may control the driving of the induction heater 70 based on the temperature sensed by the drying temperature sensor 29. That is, in order to prevent the drum 30 from being overheated and to prevent the internal temperature of the tub 20 from being overheated, the drying temperature sensor 29 may be used.

It is possible to detect dryness or humidity using the basic function and characteristics of the drying temperature sensor 29.

Since the washing-water temperature sensor 28 is provided to detect the temperature of washing water, it may be mounted on the lower portion of the tub 20. Thus, the mounting position of the washing-water temperature sensor 28 may be the same as in a general laundry treating apparatus. That is, it may be provided on the lower side in the tub 20 to be immersed in the washing water and sense the temperature of the washing water. The washing-water temperature sensor 28 may be provided on an upper portion spaced apart from the bottom surface in the tub 20. In this case, it may be located on the lower portion rather than the bottom surface of the drum 30.

Figure 8:
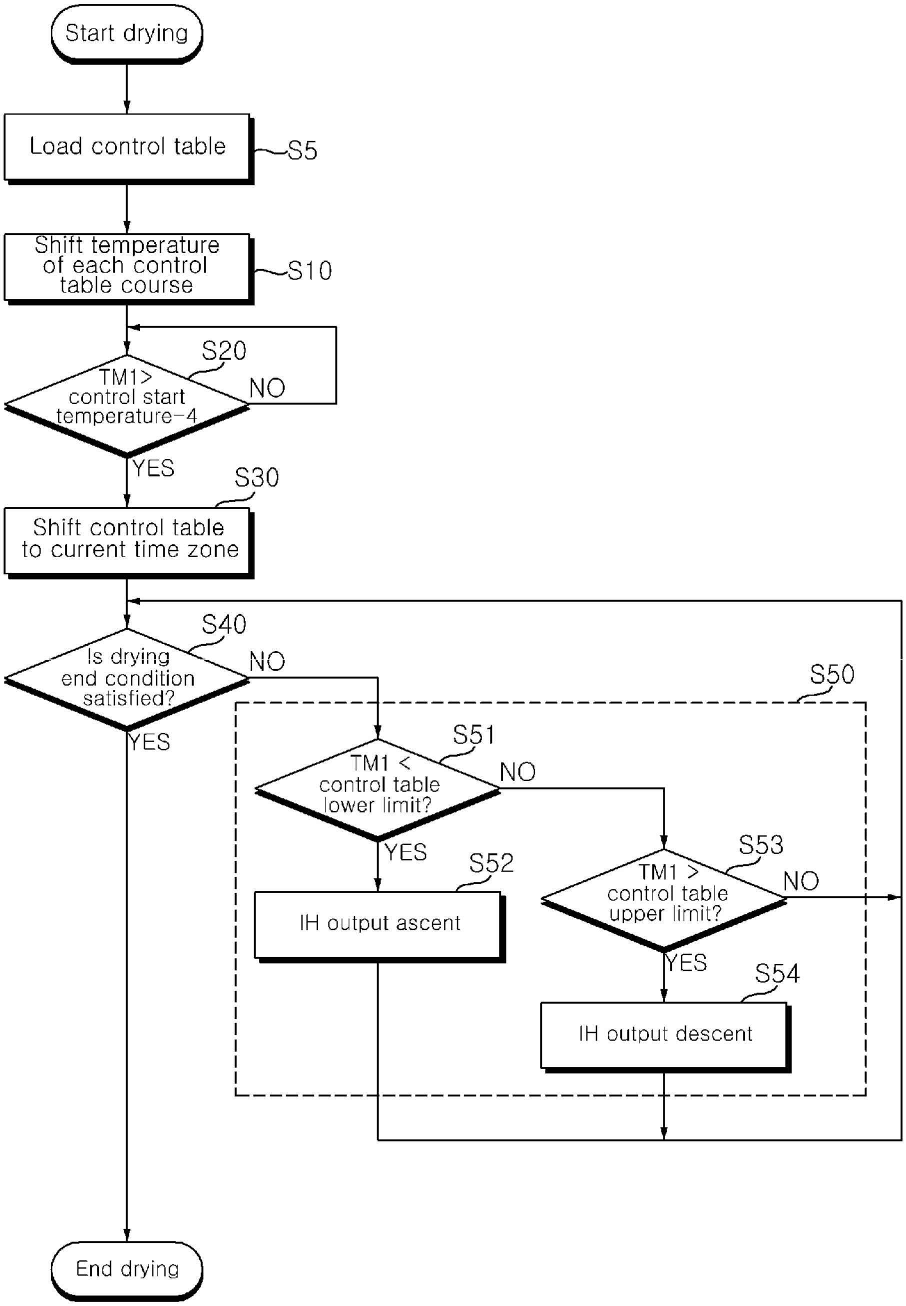
FIG. 8 is a flowchart showing a control method of the laundry treating apparatus according to an embodiment of the present disclosure.

FIG. 8 is a flowchart showing a control method of the laundry treating apparatus according to an embodiment of the present disclosure.

When drying is performed in the laundry treating apparatus such as the washer-dryer combo or the dryer, the drying unit (hereinafter referred to as the induction heater 70) such as the heater is operated and the temperature of the drum 30 rises. In order to protect the clothing, the temperature of the drum 30 may be indirectly controlled in a certain range. The laundry treating apparatus according to an aspect of the present disclosure may efficiently manage the drum temperature in the drying operation through active variable control according to drying conditions and situations.

The control temperature table (or a control profile according to the temperature) for controlling the drum 30 including a load (e.g. laundry) of a certain condition in a certain temperature range using the induction heater 70 may be experimentally created. The laundry treating apparatus according to an aspect of the present disclosure may perform drying while shifting the generated control temperature table according to various situations. The laundry treating apparatus according to an aspect of the present disclosure can prevent malfunction and efficiently manage the drum temperature by shifting and using the control temperature table according to a drying situation.

Further, the laundry treating apparatus according to an aspect of the present disclosure can reduce a burden on a memory and manufacturing cost, by using the control temperature table generated through minimal experimentation.

For example, while the control temperature table (profile) according to time is obtained only in the experiment for some load (e.g. small, medium, and large) and the control temperature table is shifted according to various situations, drying may be performed.

The laundry treating apparatus according to an aspect of the present disclosure can manage temperature while actively coping with a situation that occurs, by shifting and using the control temperature table based on a change in drying course and drum temperature.

The laundry treating apparatus according to an aspect of the present disclosure may store in the memory the control temperature table in which a control temperature according to the lapse of drying time of the laundry is recorded, and the drying unit may be operated on the basis of the control temperature table obtained by shifting the stored control temperature table at least one time.

As another example, the control method of the laundry treating apparatus according to an embodiment of the present disclosure may include a step S5 of loading a control temperature table (control table) for controlling a drum 30 including a load under a certain condition in a certain temperature range using a drying unit such as an induction heater 70, a first shift step S10 of shifting the control temperature table according to a corresponding drying course, and a second shift step S30 of shifting the control temperature table to a current time when it is determined at S20 whether a current temperature of the drum reaches a control start temperature of the corresponding drying course, so the current temperature of the drum 30 reaches the control start temperature of the corresponding drying course.

Figure 9:
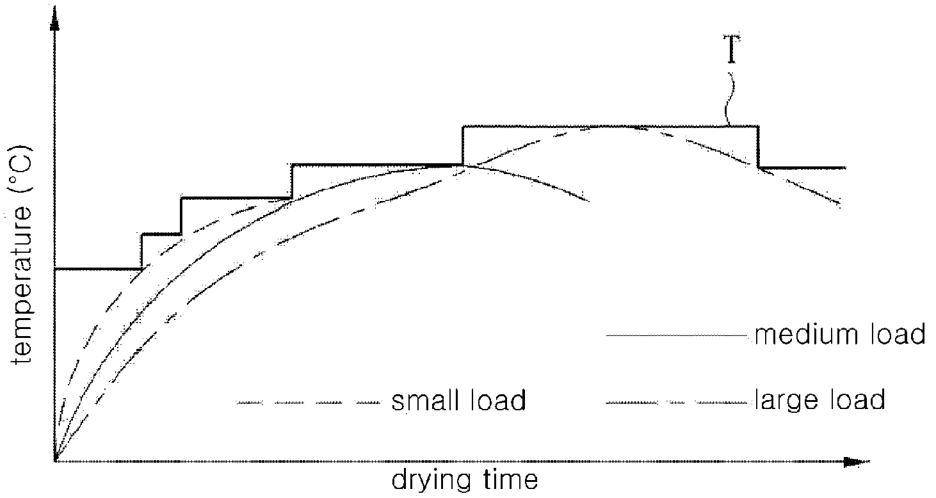
FIG. 9 is a graph illustrating the process of obtaining a control temperature table according to an embodiment of the present disclosure.

FIG. 9 is a graph illustrating the process of generating a control temperature table according to an embodiment of the present disclosure.

The process of experimentally creating the control temperature table (or the control profile according to the temperature) for controlling the drum 30 including a load (e.g. laundry) under a certain condition using the induction heater 70 in a certain temperature range may be performed as follows.

First, a wireless temperature sensor is installed in the drum 30, so that the control temperature table (or the control profile according to the temperature) may be experimentally obtained while a wireless temperature sensor value is monitored and the output of the induction heater 70 is controlled according to a target temperature (e.g., 150° C.).

At this time, for instance, the wireless temperature sensor may be temporarily installed in the drum 30. Further, the process of controlling the output of the induction heater 70 according to the target temperature (e.g., 150° C.) may be performed by a worker.

Alternatively, using the drying temperature sensor 29, the control temperature table may be generated while temperature data detected by the drying temperature sensor 29 is monitored.

For instance, the process of experimentally obtaining the control temperature table T may be carried out by performing the drying operation while manually controlling a certain amount of load (laundry).

That is, the control temperature table T may be obtained while small (e.g., 1 kg), medium (e.g., 3 kg) and large (e.g., 6 kg) loads are manually controlled and the drying operation is completed.

Specifically, the control temperature table T may be recorded while checking a change in temperature of the drying temperature sensor 29 according to the drying of such a small (e.g., 1 kg), medium (e.g., 3 kg), and large (e.g., 6 kg) load.

In some cases, such a control temperature table T (or control table) may be separately recorded for the weight of load (e.g., laundry). For instance, the control temperature table T may be recorded for three weights. The control temperature table T obtained as such may exhibit a satisfactory control effect for loads having various weights.

Figure 10:
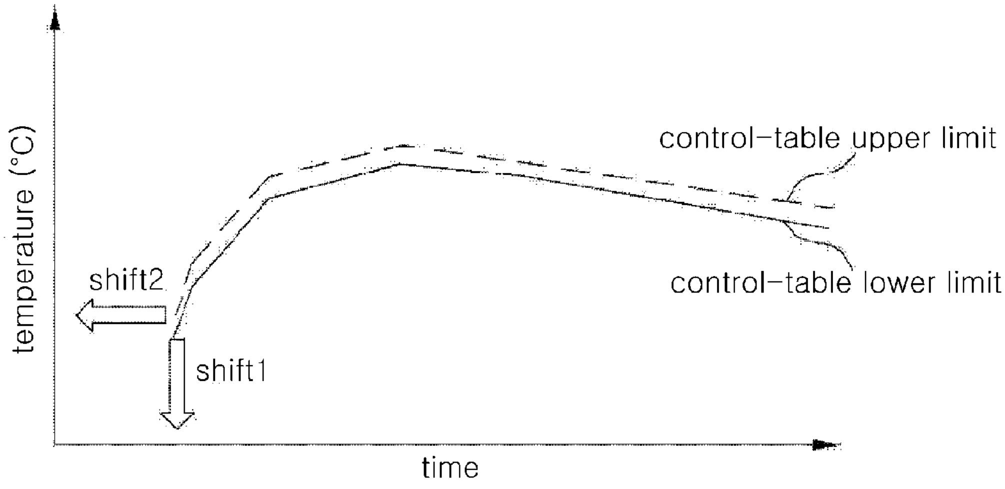
FIG. 10 is a graph showing an example of a control table created by the process of FIG. 9.

FIG. 10 is a graph showing an example of a control table created by the process of FIG. 9. Hereinafter, a drying process according to an embodiment of the present disclosure will be described in detail with reference to FIGS. 8 and 10.

First, a drying operation of drying laundry and wet clothing received in the drum 30 may be started by heating the drum 30 using the induction heater 70. For example, the drying operation of drying the load (e.g., laundry) of the first condition in the drum 30 may be started by operating the induction heater 70.

The control unit 90 may load the control temperature table T in the memory. The control temperature table T may be generated through an experiment for each load condition so that the temperature of the drum 30 is managed in a safe temperature region without excessively rising, and may be simply composed of only the control temperature according to the lapse of time. For example, the control temperature may be an appropriate temperature value at a corresponding time. For example, the control temperature may correspond to a target temperature for drying. In some cases, the control temperature may include a predetermined management range. For instance, the control temperature may include an upper limit value and a lower limit value.

According to an embodiment, the control temperature table T for controlling the drum 30 including the load of the second condition in a certain temperature range using the induction heater 70 may be loaded (S5).

As such, the second condition may be the condition of load for recording the above-described control temperature table T. That is, referring to the example of FIG. 9, the second condition may be a condition depending on the weight of a certain load. As described above, the second condition may be small (e.g., 1 kg), medium (e.g., 3 kg) and large (e.g., 6 kg) load.

Meanwhile, the first condition may be a load (laundry) for performing an actual drying operation. Such a first condition may be different from the second condition. That is, the first condition and the second condition may be different in drying course, dry weight, laundry type, continuous drying, intermittent drying, or the like.

Subsequently, the control temperature table T may be shifted (shift1) according to the corresponding drying course (first shift step, S10). For example, as a specific drying course is selected, the control temperature table T may be shifted (shift1) by a preset temperature.

Next, it may be determined whether the current temperature of the drum 30 reaches a control start temperature of the corresponding drying course or a reference temperature (S20). In this case, the current temperature may be determined through the above-described drying temperature sensor 29 (TM1).

The control start temperature may be the start point of temperature control, and the control unit 90 may control temperature based on whether the control start temperature has been reached, an arrival time, an expected arrival time, or the like.

In some cases, the reference temperature may be set with a predetermined margin for the control start temperature, and the control unit 90 may control temperature based on the control start temperature and/or the reference temperature.

As a specific example, it may be determined whether the sensing value of the drying temperature sensor TM1 has reached the control start temperature. At this time, there may be a difference in temperature between the drying temperature sensor TM1 and the actual drum 30, and the arrival of the control start temperature may be determined by applying the difference value. For instance, it may be determined whether the sensing value of the drying temperature sensor TM1 has reached a difference value (e.g., temperature as low as 4° C.) from the control start temperature (or whether it is greater than a difference value (e.g. temperature obtained by subtracting 4° C.) from the control start temperature).

Subsequently, if it is determined that the current temperature of the sensed drum 30 reaches the control start temperature of the corresponding drying course, the control temperature table T may be shifted to the current time (second shift step, S30). Here, the current time may mean time measuring the current temperature.

Table 1 shows the control start temperature for each course.

TABLE 1

| Temperature shift for each course | Control start temperature | Drum Target |
|---|---|---|
| Normal | 85 C. | 150 C. |
| Low Temp | 60 C. | 110 C. |
| Abnormal load detection | 45 C. | 110 C. |

As shown in Table 1, temperature (drum temperature) at which control starts for each drying course may be preset. Further, at this time, the target temperature (Drum Target) of the drum 30 may be preset.

Further, Table 1 shows the degree of temperature shift for each set drying course. That is, for example, the control start temperature may be differently set according to situations such as Normal, Low Temp, or abnormal load detection.

For example, under the normal condition, the control start temperature may be 85° C. At this time, the target drum temperature may be 150° C. This may mean that the control of the induction heater 70 is started when the temperature of the drum 30 reaches 80° C. under the corresponding condition (or course).

That is, unless the induction heater 70 is controlled when the temperature of the drum 30 reaches 80° C., it may be difficult to control the drum 30 at the target drum temperature. For instance, unless the induction heater 70 is controlled when the temperature of the drum 30 reaches 80° C., the temperature of the drum 30 may be overheated beyond the target drum temperature.

Thus, when the temperature of the drum 30 reaches 80° C. under the corresponding condition (or course), the control of the induction heater 70 is started. At this time, the induction heater 70 may be controlled according to the control temperature table T obtained as described above.

As such, for instance, the drying operation may be controlled by obtaining the control temperature table T only in the experiment for load (e.g. small, medium, and large) and shifting (shift1, shift2) the control temperature table T obtained in this manner according to various situations That is, depending on the conditions of the load, the control temperature table T may be shifted (shift1, shift2) according to various situations.

For instance, pieces of data on control temperature corresponding to each time may be collectively changed by temperature that is set for each drying course. According to an embodiment, as the drying of laundry is started, the control temperature table may be shifted on the basis of the set drying course.

The shift of the control temperature table may include collectively changing time data corresponding to each control temperature. For example, the control temperature table may be shifted by a difference between time when a temperature detected by the drying temperature sensor 29 disposed to be spaced apart from the drum 30 reaches a reference temperature and time when the control temperature table reaches the reference temperature.

The control temperature table may include the upper limit value and the lower limit value of the control temperature.

The control unit 90 may increase the output of the drying unit when the temperature detected by the drying temperature sensor 29 is smaller than the lower limit value, and may reduce the output of the drying unit when the temperature detected by the drying temperature sensor is larger than the upper limit value.

Further, the control unit 90 may increase the output of the drying unit if the time when the temperature detected by the drying temperature sensor 29 reaches the reference temperature (or control start temperature) set on the basis of the control start temperature is slower than the time when the control temperature table reaches the reference temperature, and may reduce the output of the drying unit if the time when the temperature detected by the drying temperature sensor 29 reaches the reference temperature is faster than the time when the control temperature table reaches the reference temperature. Thus, it is possible to actively cope with the temperature situation of the drum 30 and to stably manage the temperature within a certain range.

For instance, the temperature of the drum 30 may rapidly or slowly rise when drying is performed according to an increase or reduction in load amount, an increase or reduction in water content of load (laundry), type of load (laundry) (e.g. type of fibers), etc.

For example, in the case of the corresponding load (or course) on the control temperature table T, the control of the induction heater 70 is started at a certain time. The temperature of the drum 30 may not reach the control start temperature even in the corresponding time. In contrast, the temperature of the drum 30 may reach the control start temperature before the corresponding time. Then, the control temperature table T may be shifted (shift2) according to a difference in time.

That is, if the temperature of the drum 30 reaches the control start temperature (e.g., 85° C. before the corresponding time according to the load, the control temperature table T may be shifted (shift2) to time (hereinabove referred to as current time) reaching the control start temperature.

For example, when the temperature of the drum 30 rapidly rises, the control temperature table T may be applied by advancing it to a fast time zone. When the temperature of the drum 30 gently rises, the control temperature table T may be applied by delaying it to a slow time zone (shift2).

Further, the shift (shift1) of the control temperature table T may be applied to the temperature axis for each drying course.

For example, the control temperature table T may be applied high to be fit for high-temperature setting in a general drying course, and the control temperature table T may be applied low to be fit for low-temperature setting in a low-temperature drying course or the like.

Such a control temperature table T may be recorded according to temperature and time for controlling the drum 30 including the load in a certain temperature range.

Referring to FIG. 10, the control temperature table T may be shifted to be parallel to a time axis (shift2) or a temperature axis (shift1).

That is, the first shift step (shift1; S10) may fix the control temperature table T for the time and shift it in the temperature direction. Further, the second shift step (shift2; S30) may fix the control temperature table T for the temperature and shift it in the temperature direction.

At this time, the first shift step (shift1; S10) and the second shift step (shift2; S30) may be performed in different orders. For example, in some cases, the step S20 of determining whether the current temperature of the drum 30 reaches the control start temperature of the corresponding drying course and the second shift step (shift2; S30) may be performed prior to the first shift step (shift1; S10). Alternatively, according to an implementation, the first shift step (shift1; S10) and the second shift step (shift2; S30) may be simultaneously performed.

Further, at least one of the first shift step (shift1; S10) and the second shift step (shift2; S30) may be performed in real time and continuously while drying is performed. For example, at least one of the first shift step (shift1; S10) and the second shift step (shift2; S30) may be performed by continuously detecting the temperature of the drum 30 in real time.

That is, when the sensing value of the drying temperature sensor TM1 is acquired in real time and is different from the temperature on the control temperature table T, the control unit 90 may control to perform at least one of the first shift step (shift1; S10) and the second shift step (shift2; S30) again in the corresponding time.

Meanwhile, referring to FIG. 10, the control temperature table T may include an upper limit value and a lower limit value for controlling the above-described drum 30 in a certain temperature range.

For example, when the control temperature table T is created, the temperature of the drum 30 may be controlled within a certain width. This may be a characteristic that is inherently included when the temperature is controlled using the temperature sensor.

Turning back to FIG. 8, subsequently, the step S40 of determining whether the currently performed drying operation satisfies the drying end condition may be performed. That is, it may be determined whether the drying of load (laundry) has been completed. For example, the control unit 90 may determine the dryness of load (laundry) on the basis of the data sensed by various sensors, and determine whether the drying is completed or not.

When it is determined that the drying of the load (laundry) is completed, i.e., the currently performed drying operation satisfies the drying end condition, the corresponding drying operation may be completed.

In contrast, when it is determined that the drying of the load (laundry) is not completed, i.e., the currently performed drying operation does not satisfy the drying end condition, the step S50 of regulating the output of the induction heater 70 may be performed.

For example, when the currently performed drying operation does not satisfy the drying end condition, the output of the induction heater 70 may be increased or reduced by regulating the output of the induction heater 70.

Specifically, in the step S50 of regulating the output of the induction heater 70, the control unit 90 may determine whether the temperature of the drum 30 is smaller than the lower limit value (S51).

When the temperature (sensing value of the drying temperature sensor TM1) of the drum 30 is smaller than the lower limit value of the control temperature table T, the control unit 90 may increase the output of the induction heater 70 (S52).

Further, the control unit 90 may determine whether the temperature (sensing value of the drying temperature sensor TM1) of the drum 30 is larger than the upper limit value of the control temperature table T (S53). When the temperature (sensing value of the drying temperature sensor TM1) of the drum 30 is larger than the upper limit value of the control temperature table T, the control unit 90 may reduce the output of the induction heater 70 (S54).

In some cases, the control unit 90 may first determine whether the temperature (sensing value of the drying temperature sensor TM1) of the drum 30 is smaller than the lower limit value of the control temperature table T, and may determine whether the temperature (sensing value of the drying temperature sensor TM1) of the drum 30 is larger than the upper limit value of the control temperature table T when the temperature of the drum 30 is not smaller than the lower limit value (S53).

When the temperature (sensing value of the drying temperature sensor TM1) of the drum 30 is larger than the upper limit value of the control temperature table T, the control unit 90 may reduce the output of the induction heater 70 (S54).

The above-described steps of performing the drying operation may be performed by the control unit 90 (see FIG. 3) of the above-described laundry treating apparatus.

Figure 11:
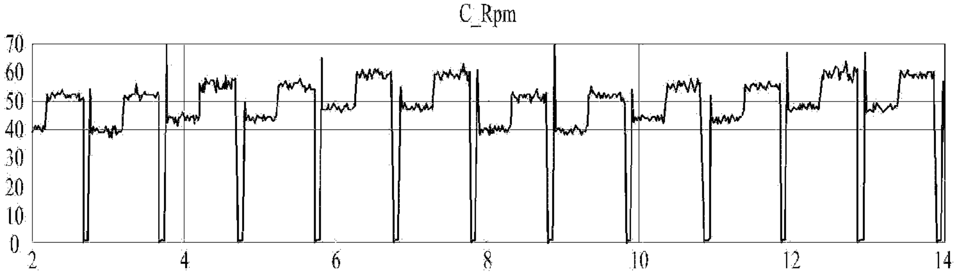
FIG. 11 is a graph showing a drying operation by the control method of the laundry treating apparatus according to an embodiment of the present disclosure.

FIG. 11 is a graph showing a drying operation by the control method of the laundry treating apparatus according to an embodiment of the present disclosure.

FIG. 11 shows a specific example of the drying operation. For instance, FIG. 11 shows the rpm of the drum 30 according to the drying time in the drying operation.

In this drying operation, the drum 30 may be first rotated for a certain time at a first rpm clockwise, be rotated for a certain time at a second rpm larger than the first rpm, and then be stopped rotating.

For example, as shown in FIG. 11, after the drum 30 is rotated for a certain time at 40 rpm, the rpm may increase to 52 rpm and then the drum 30 may be rotated for a certain time.

At this time, the drum 30 may be rotated for a relatively longer time at high rpm. For example, after the drum 30 is rotated for 27 seconds at 40 rpm, the drum may be rotated for 30 seconds at 52 rpm. Thereafter, the drum 30 may stop driving for a certain time.

This operation may be repeatedly performed by changing the rotating direction counterclockwise. That is, the drum 30 may be driven by changing only the rotating direction of the drum 30 at the same rpm for the same time.

Subsequently, the rpm may be gradually increased. This increasing step may correspond to a certain number of times. For example, the initial driving rpm of the drum 30 may be increased stepwise from 40 rpm through 44 rpm to 48 rpm, and then the same operation may be repeated in a state where the rpm is reduced again. This operation may be repeatedly performed until drying is completed.

As described above, according to an embodiment of the present disclosure, the drying operation may be performed in response to all environments and situations, using a single control temperature table T.

Conventionally, it was necessary to experimentally obtain and set the control temperature table for many situations. In particular, it was necessary to experimentally obtain the control temperature table in response to all environments and situations.

Accordingly, a lot of experimentation may be required to control drying temperature. That is, a lot of experimentation may be required according to conditions such as a drying course (normal/low temperature), a load (small/medium/large), a drying situation (intermittent/continuous), outdoor temperature (low temperature/room temperature/high temperature), fabric (synthetic fiber/cotton, etc.), and a water content (low/middle/high). These conditions may correspond to the above-described first condition applied to the actual laundry.

In other words, when drying is performed in the laundry treating apparatus, the induction heater 70 may be operated and the temperature of the drum 30 may be increased. In order to protect clothing (laundry), the temperature of the drum 30 may be controlled to maintain a target temperature (e.g., 150° C.).

At this time, the temperature of the drum 30 may be indirectly measured using the drying temperature sensor TM1 that is disposed to be spaced apart from the drum 30, and the control unit 90 may control the laundry treating apparatus on the basis of temperature data sensed by the drying temperature sensor TM1. Here, the control unit 90 may perform a control operation on the basis of the control temperature table, and the control temperature table may require many experiment processes as described above. That is, experiments with small, medium, and large loads are conducted, and the control temperature table should be obtained through manual experiments according to each situation such as a low-temperature drying course (target temperature 110° C.), continuous drying, high-temperature condition, or low water content condition.

In the case of drying in different courses and situations (low-temperature drying course, continuous drying situation, washing or drying related course, high-temperature outdoor-air condition, mixed-material clothing, low water-content load, etc.) using the control temperature table obtained through the above-described method, the output fluctuation of the induction heater 70 becomes severe. Thereby, the fluctuation of the system temperature also becomes severe, thus affecting a detection method using temperature (dryness detection, abnormal-state detection, etc.) and thereby causing a false detection.

Further, even if the control temperature table is experimentally obtained and applied according to each situation, there is a high probability that a false detection occurs due to unexpected conditions, etc., and many control tables should be configured, which may impose a heavy burden on a system memory.

However, as described above, according to an embodiment of the present disclosure, the control temperature table T may be obtained only through experiments for load (small, medium, and large) (which may correspond to the second condition), and the control temperature table T obtained in this way may be shifted and applied according to various situations (i.e. the first condition).

That is, by using an active variable control applied in all situations using one control temperature table, experimentation required for drying load under several conditions can be remarkably reduced, and it is possible to stably control the induction heater even in an unexpected situation.

For this reason, it is possible to improve system control stability. That is, it is possible to reduce the probability of false detection of an algorithm based on temperature and induction heater output.

Moreover, since only one control temperature table may be used, a control unit (Micom) memory can be efficiently used.

FIGS. 12 to 17 are graphs showing the actual example of the drying operation performed by shifting the control temperature table depending on various situations according to an embodiment of the present disclosure.

That is, FIGS. 12 to 17 show the actual example in which the drying operation is controlled by shifting (shift1 and shift2) the above-described control temperature table T according to various situations, depending on a drying condition, for example, continuous drying or intermittent drying, a Normal course and a Low Temp course.

Figure 12:
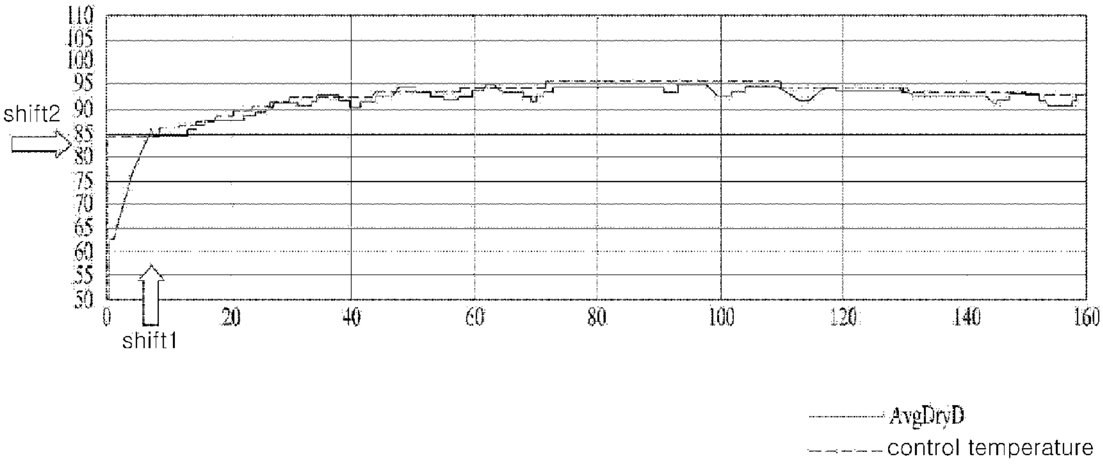
FIGS. 12 to 17 are graphs showing the actual example of the drying operation performed by shifting the control temperature table depending on various situations according to an embodiment of the present disclosure.
Figure 14:
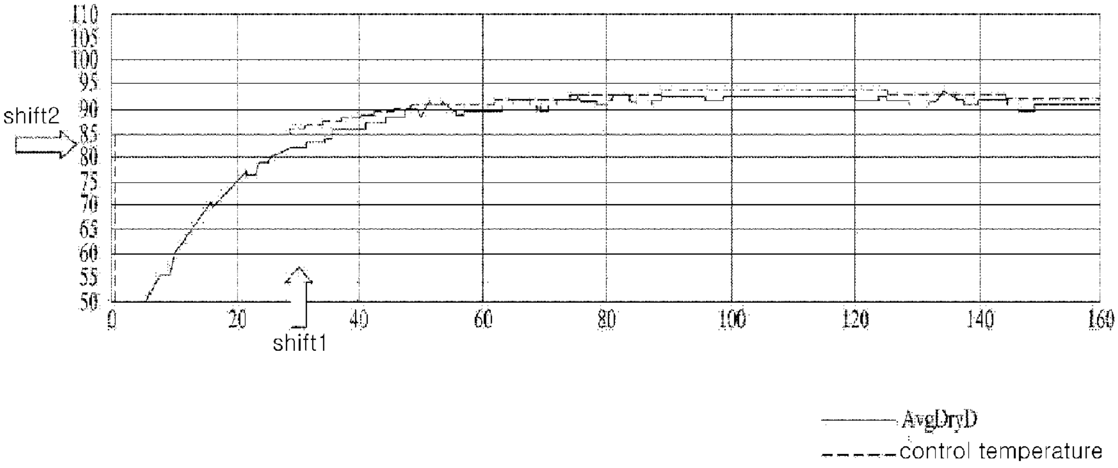
Figure 16:
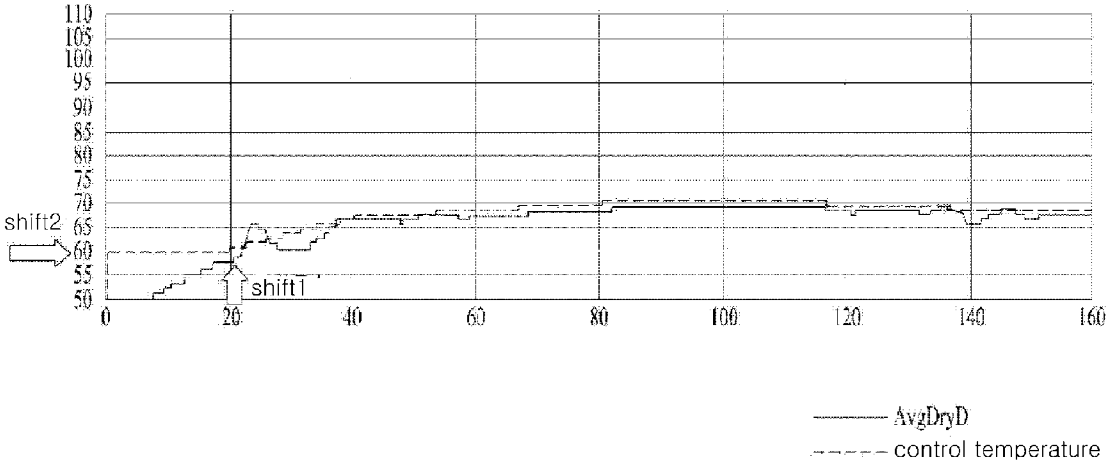

In FIGS. 12, 14, and 16, AvgDryD indicates average temperature in the sensor for control (e.g., drying temperature sensor TM1).

Figure 13:
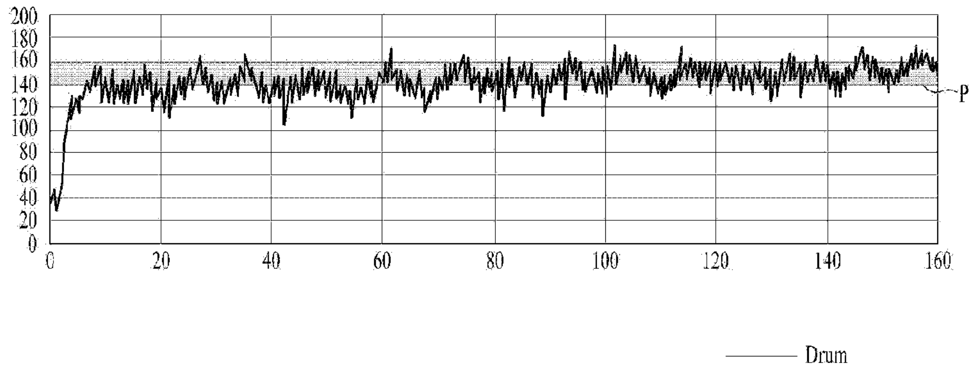

First, FIG. 12 shows a shift process in a state of continuous drying (when the drying operation is performed continuously after the drying operation is performed before, that is, the temperature of the drum 30 is increased) in the Normal course, and FIG. 13 shows a state in which the temperature of the drum 30 is controlled.

Referring to FIG. 12, an example of the control start temperature is 85° C. At this time, as the temperature of the drum 30 is increased at time shown by the arrow of FIG. 12, the control temperature table T is shifted (shift1 and shift2). In this state, the drying operation is performed.

In this regard, referring to FIG. 13, when the drying operation is performed in the state where the control temperature table T is shifted (shift1 and shift2), the temperature of the drum 30 may be controlled in a target region P.

Figure 15:
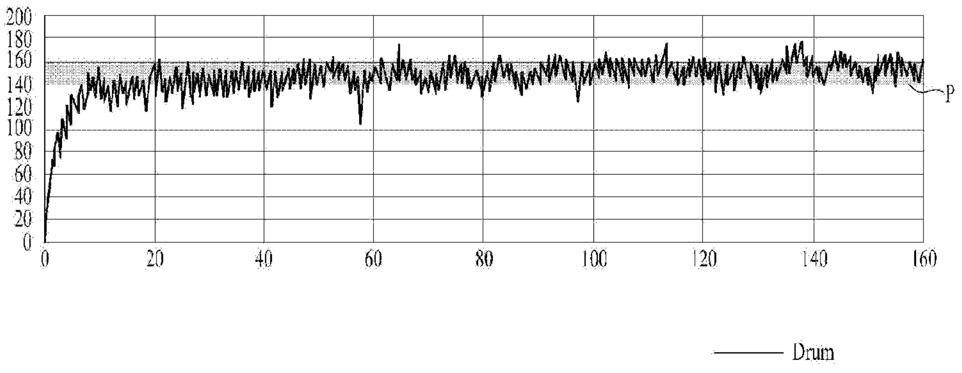

Further, FIG. 14 shows a shift process in a state of intermittent drying (when the drying operation is not performed before, that is, the temperature of the drum 30 is not increased) in the Normal course, and FIG. 15 shows a state in which the temperature of the drum 30 is controlled.

Referring to FIG. 14, an example of the control start temperature is 85° C. At this time, as the temperature of the drum 30 is increased at time shown by the arrow of FIG. 14, the control temperature table T is shifted (shift1 and shift2). In this state, the drying operation is performed.

Compared with the case of FIG. 12, in the case of FIG. 14, it can be seen that the temperature is relatively slowly increased, and thus, the shift2 is biased to the right during the shift of the table T. That is, it can be seen that the control start time is slow.

In this regard, referring to FIG. 15, when the drying operation is performed in the state where the control temperature table T is shifted (shift1 and shift2), the temperature of the drum 30 may be likewise controlled in the target region P.

Figure 17:
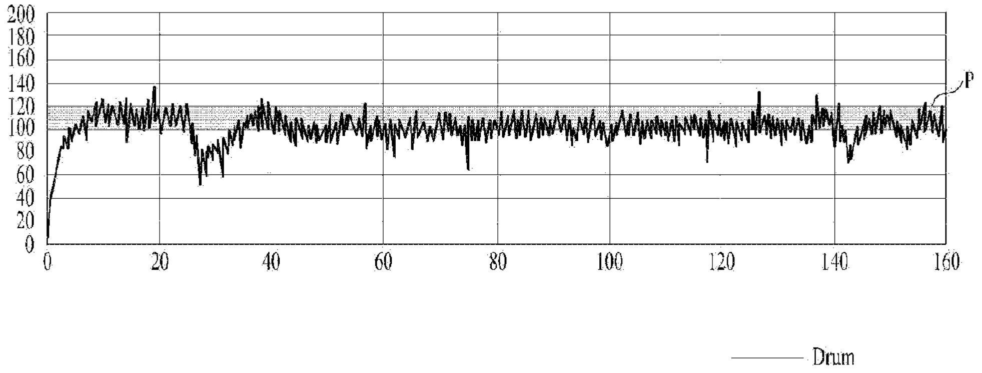

Meanwhile, FIG. 16 shows a shift process in a state of intermittent drying (when the drying operation is not performed before, that is, the temperature of the drum 30 is not increased) in the Low Temp course, and FIG. 17 shows a state in which the temperature of the drum 30 is controlled.

Referring to FIG. 16, an example of the control start temperature is 60° C. At this time, as the temperature of the drum 30 is increased at time shown by the arrow of FIG. 16, the control temperature table T is shifted (shift1 and shift2). In this state, the drying operation is performed.

Compared with the cases of FIGS. 12 and 14, in the case of FIG. 16, it can be seen that the shift1 is performed at the temperature of 60° C.

Further, it can be seen that the temperature due to the shift1 may be increased to a state corresponding to the middle of the cases of FIGS. 12 and 14, and accordingly, the shift2 is located in the middle of the cases of FIGS. 12 and 14 during the shift of the table T.

In this regard, referring to FIG. 17, when the drying operation is performed in the state where the control temperature table T is shifted (shift1 and shift2), the temperature of the drum 30 may be likewise controlled in the target region P.

The above description is merely illustrative of the technical idea of the present disclosure, and those of ordinary skill in the art to which the present invention pertains can make various modifications and variations without departing from the essential characteristics of the present disclosure.

Therefore, the embodiments disclosed in the present invention are for explanation rather than limiting the technical spirit of the present disclosure, and the scope of the technical spirit of the present disclosure is not limited by these embodiments.

The protection scope of the present disclosure should be construed by the following claims, and all technical ideas within the scope equivalent thereto should be construed as being included in the scope of the present disclosure.

What is claimed is:

1. A laundry treating apparatus comprising:

a drum configured to receive laundry;

a motor configured to rotate the drum;

a drying unit configured to heat the laundry by heating the drum;

a memory configured to store a control temperature table in which a control temperature according to a lapse of drying time of the laundry is recorded;

a drying temperature sensor disposed to be spaced apart from the drum; and a control unit configured to control output of the drying unit on the basis of a shifted control temperature table obtained by shifting the stored control temperature table at least once, wherein the stored control temperature table is shifted by a difference between a time when a temperature detected by the drying temperature sensor reaches a reference temperature and a time when the stored control temperature table reaches the reference temperature.

2. The laundry treating apparatus of claim 1, wherein the shift of the stored control temperature table comprises collectively changing control temperature data corresponding to each time by a temperature that is set for each drying course.

3. The laundry treating apparatus of claim 1, wherein the stored control temperature table is shifted on the basis of a set drying course as the laundry starts drying.

4. The laundry treating apparatus of claim 1, wherein the shift of the stored control temperature table comprises collectively changing time data corresponding to each control temperature.

5. A laundry treating apparatus comprising:

a drum configured to receive laundry;

a motor configured to rotate the drum;

a drying unit configured to heat the laundry by heating the drum;

a memory configured to store a control temperature table in which a control temperature according to a lapse of drying time of the laundry is recorded;

a drying temperature sensor disposed to be spaced apart from the drum; and a control unit configured to:

control output of the drying unit on the basis of a shifted control temperature table obtained by shifting the stored control temperature table at least once, wherein the shifted control temperature table comprises an upper limit value and a lower limit value of the control temperature;

increase an output of the drying unit when the temperature detected by the drying temperature sensor is smaller than the lower limit value; and reduce the output of the drying unit when the temperature detected by the drying temperature sensor is greater than the upper limit value.

6. A laundry treating apparatus comprising:

a drum configured to receive laundry;

a motor configured to rotate the drum;

a drying unit configured to heat the laundry by heating the drum;

a memory configured to store a control temperature table in which a control temperature according to a lapse of drying time of the laundry is recorded;

a drying temperature sensor disposed to be spaced apart from the drum; and a control unit configured to:

control output of the drying unit on the basis of a shifted control temperature table obtained by shifting the stored control temperature table at least once;

increase the output of the drying unit when the time when the temperature detected by the drying temperature sensor reaches a reference temperature is slower than the time when the shifted control temperature table reaches the reference temperature; and reduce the output of the drying unit when the time when the temperature detected by the drying temperature sensor reaches the reference temperature is faster than the time when the shifted control temperature table reaches the reference temperature.

7. The laundry treating apparatus of claim 1, wherein the drying temperature sensor is not overlapped by the drying unit in a vertical direction.

8. The laundry treating apparatus of claim 1, further comprising a tub, wherein the drum is rotatable in the tub.

9. The laundry treating apparatus of claim 8, wherein the drying temperature sensor is disposed to extend from the tub into a space between the tub and the drum, wherein the drying temperature sensor is not overlapped by the drying unit in a vertical direction.

10. The laundry treating apparatus of claim 8, wherein the drying unit comprises an induction heater.

11. The laundry treating apparatus of claim 1, wherein the drying unit comprises an induction heater.

12. A laundry treating apparatus comprising:

a drum configured to receive laundry;

a motor configured to rotate the drum;

an induction heater configured to heat the laundry by heating the drum;

a drying temperature sensor spaced apart from the drum so as to not be overlapped by the induction heater in a vertical direction;

a tub, wherein the drum is rotatable in the tub; and a control unit configured to control output of the induction heater on the basis of a shifted control temperature table obtained by shifting the stored control temperature table at least once, wherein the stored control temperature table is shifted by a difference between a time when a temperature detected by the drying temperature sensor reaches a reference temperature and a time when the stored control temperature table reaches the reference temperature.

13. A laundry treating apparatus comprising:

a drum configured to receive laundry;

a motor configured to rotate the drum;

an induction heater configured to heat the laundry by heating the drum;

a drying temperature sensor spaced apart from the drum so as to not be overlapped by the induction heater in a vertical direction;

a tub, wherein the drum is rotatable in the tub; and a control unit configured to:

control output of the induction heater on the basis of a shifted control temperature table obtained by shifting the stored control temperature table at least once, wherein the shifted control temperature table comprises an upper limit value and a lower limit value of the control temperature;

increase an output of the induction heater when the temperature detected by the drying temperature sensor is smaller than the lower limit value; and reduce the output of the induction heater when the temperature detected by the drying temperature sensor is greater than the upper limit value.

14. A laundry treating apparatus comprising:

a drum configured to receive laundry;

a motor configured to rotate the drum;

an induction heater configured to heat the laundry by heating the drum;

a drying temperature sensor spaced apart from the drum so as to not be overlapped by the induction heater in a vertical direction;

a tub, wherein the drum is rotatable in the tub;

a control unit configured to:

control output of the induction heater on the basis of a shifted control temperature table obtained by shifting the stored control temperature table at least once;

increase the output of the induction heater when the time when the temperature detected by the drying temperature sensor reaches a reference temperature is slower than the time when the shifted control temperature table reaches the reference temperature; and reduce the output of the induction heater when the time when the temperature detected by the drying temperature sensor reaches the reference temperature is faster than the time when the shifted control temperature table reaches the reference temperature.

* * * * *